United States Patent [19]

Chapurlat

[11] 4,073,724
[45] Feb. 14, 1978

[54] ANISOTROPIC PHENOLIC POLYETHER MEMBRANE

[75] Inventor: Robert Chapurlat, Ecully, France

[73] Assignee: Rhone-Poulenc, S.A., Paris, France

[21] Appl. No.: 445,287

[22] Filed: Feb. 22, 1974

[30] Foreign Application Priority Data

Feb. 27, 1973 France .............................. 73 06869

[51] Int. Cl.$^2$ ............................................. B01D 31/00
[52] U.S. Cl. ............................. 210/23 H; 260/2.2 R; 210/500 M
[58] Field of Search ............... 264/41, 49; 260/2.2 R; 210/490, 500 M, 23, 321

[56] References Cited

U.S. PATENT DOCUMENTS

| 3,259,592 | 7/1966 | Fox et al. ........................... 260/2.2 R |
| 3,615,024 | 10/1971 | Michaels ............................. 210/490 |
| 3,709,774 | 1/1973 | Kimura ............................. 210/490 X |
| 3,754,375 | 8/1973 | Bouchilloux et al. .................... 55/16 |

*Primary Examiner*—Frank A. Spear, Jr.
*Attorney, Agent, or Firm*—Stevens, Davis, Miller & Mosher

[57] ABSTRACT

Anisotropic membranes particularly useful in reverse osmosis because of their good salt rejection properties and high transmission rate are provided which consist essentially of a polymer comprising a plurality of units of the formula

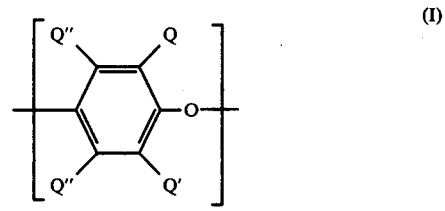

in which each of the symbols Q, Q' and Q'', which can be identical or different, represents a hydrogen atom, an alkyl radical with 1 to 4 carbon atoms or a —SO$_3$H radical, the number of —SO$_3$H radicals in the polymer being such that the ionic capacity of the polymer is from about 0.5 to about 5 meg/g, in the form of a layer which exhibits a degree of salt rejection, said layer having an equivalent thickness of from about 0.01 to about 5 μ, and a highly porous support layer, of thickness up to about 1 mm.

10 Claims, No Drawings

ANISOTROPIC PHENOLIC POLYETHER MEMBRANE

The present invention relates to an anisotropic membrane made of a sulphonated phenolic polyether.

Cation exchange resins based on sulphonated aromatic polyethers are described in, for example, U.S. Pat. No. 3,259,592. This patent also describes the preparation of cation exchange membranes by casting a solution of sulphonated polymer and evaporating the solvent. The production of membranes by extrusion is also mentioned. Such membranes can be used in electrodialysis, for example as elements of fuel cells and battery separators. It is known, however, that in applications such as reverse osmosis, the flow rate is an important property for the membrane and consequently, it is desirable to manufacture membranes having as low a thickness as possible.

The technique for the preparation of membranes described in the above-mentioned patent hereafter referred to as the conventional technique gives rise to membranes, the structure of which is substantially homogeneous throughout the entire thickness of the membrane. It is clear that it is not possible, without running the risk of producing very fragile products, to decrease the thickness to a few microns, or even to tens of microns. New membranes made of phenolic polyethers have now been found which show, for example in reverse osmosis, properties comparable to those of membranes prepared in accordance with such a conventional technique, the thickness of which would be considerably less than 10μ. These membranes have an asymmetric structure and comprise an active layer, that is to say one which acts as a barrier for salts, and a support layer which shows substantially no salt rejection activity. The thickness of the active layer can be deduced by studying its osmotic properties in relation to those of a membrane prepared in accordance with the conventional technique from the same polymer. This thickness will be called "equivalent thickness."

The membranes, according to the present invention consist essentially of a polymer comprising a plurality of units of the formula

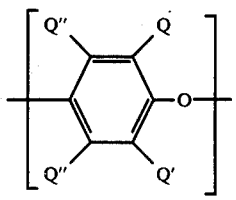

(I)

in which the symbols Q, Q' and Q", which can be identical or different, each represents a hydrogen atom, an alkyl radical with 1 to 4 carbon atoms or a —SO$_3$H radical, the number of —SO$_3$H radicals represented by the symbols Q, Q' and Q" being such that the ionic capacity of the polymer is between about 0.5 and about 5 meg/g, in the form of an active layer, that is to say one which possesses a degree of salt rejection the equivalent thickness of which is between about 0.01 and about 5 μ, and a highly porous support layer, the thickness of which can be as much as 1 mm.

The existence of the asymmetric character of the membrane can be demonstrated, firstly, by optical examination and, secondly, by examining the variation in the osmotic properties of the membrane depending on which face is brought into contact with the solution to be treated. In fact, on one of the faces of the membrane (the active layer face,) no pores can be detected on examination at a magnification of 20,000. In contrast, the other face shows a very porous structure, it being possible for the diameter of the pores to be as much as several tens of microns, for example 20 to 50 microns, at the surface. In general terms, the total volume of the pores represents 50 to 90% of the total volume of the membrane. This pore volume can be determined from the density of the membrane, by comparison with that of a membrane prepared in accordance with the conventional technique from the same polymer.

Furthermore, if, using a given solution and under given working conditions, the degree of rejection and the flow rate of the membrane are measured, it can be seen that the values found are very different depending on the face of the membrane brought into contact with the solution to be treated; this is also a good illustration of the anisotropy of the membrane.

In the determination of the equivalent thickness of the active layer, the information on which the comparison between the anisotropic membrane and the membrane prepared in accordance with the conventional technique is based is the flow rate of water, measured during a reverse osmosis operation carried out with a 5 g/l aqueous NaCl solution, the temperature being 20° C and the pressure 30 bars. The face of the membrane in contact with the solution to be treated should be the active face.

The ionic capacity denotes the number of acid groups in the polymer and is expressed in milliequivalents of ion exchanged per gram of polymer. It is also known as the "theoretical exchange capacity" in the field of ion exchange resins.

Preferably, the symbols Q and Q' in formula (I) represent an alkyl radical containing 1 to 4 carbon atoms, and the symbols Q" represent a hydrogen atom or a —SO$_3$H group, the numbers of Q" radicals representing such a group being such that the ionic capacity of the polymer is between about 0.8 and about 3 meg/g.

The specific viscosity of the polymers used in the invention is generally between about 0.3 and about 1.5 (measured at 25° C as a 5 g/l solution of polymer of a mixture of equal parts of chloroform and methanol). This specific viscosity is preferably between about 0.5 and about 1.

Polymers containing recurring units of formula (I) can be produced by reacting phenolic polyethers free from —SO$_3$H groups with a sulphonation agent such as sulphuric acid or chlorosulphonic acid, in accordance with the technique described in the above mentioned U.S. patent.

The invention also provides a process for the preparation of the membranes of this invention. This process comprises the following steps:

(a) casting, on a support, a solution comprising: the polymer, two solvents for the polymer, with substantially different boiling points, and a non-solvent for the polymer with a boiling point substantially higher than that of the most volatile solvent, (b) removing at least part of the most volatile solvent, and (c) treating the film thus produced with a non-solvent for the polymer.

In general terms, a pair of solvents should be chosen such that it is possible to remove a considerable proportion of the most volatile solvent without the least volatile solvent also being removed. Solvents, the boiling points of which differ by at least 30° C, are preferably used together.

Likewise, it is necessary to be able to remove the most volatile solvent without substantially removing the non-solvent. A non-solvent is preferably chosen, the boiling point of which is at least 30° C higher than that of the most volatile solvent.

By way of illustration of solvents which can be used from which the abovementioned pair may be selected, there may be mentioned halogenated aliphatic and aromatic hydrocarbons such as dichloromethane, dichloroethylene, tetrachloroethylene, chloroform, monochlorobenzene and dichlorobenzene, 2-N-methylpryrrolidone, dimethylformamide, dimethylacetamide, tetrahydrofurane, alcohols such as methanol and isopropanol, and ketones such as cyclohexanone.

Suitable non-solvents include polyols such as glycerine, and aqueous and aqueous-alcoholic solutions of salts, for example sodium, potassium and calcium chloride, nitrate and sulphate, insofar as the combinations of anions and cations do not produce compounds which are insoluble in water or the water/alcohol mixture.

In general terms, the weight of the most volatile solvent represents 10 to 70% of the weight of the solvent mixture, and the weight of the non-solvent represents 2 to 15% of the weight of the mixture of solvents and non-solvent.

The concentration of the casting solution is generally between 5 and 40% (weight of the polymer/weight of solution).

Different procedures may be adopted to prepare the casting solution. It is thus possible to dissolve the polymer in the mixture of solvents and then to add the non-solvent; it is also possible to dissolve the polymer in one of the solvents and then to add the other solvent and the non-solvent. Of course it is also possible to carry out the dissolution in only a part of one or both of the solvents and then to add the remainder of the ingredients. When the polymer is already in the form of a solution, it suffices to add another solvent (if necessary) followed by the non-solvent. As a general rule, the casting solution can be prepared at ambient temperature or with gentle heating.

The choice of the support used for the casting is not critical; it is possible to employ the usual supports such as a glass plate for a discontinuous operation, or a metal belt, especially for a continuous casting. The thickness of the layer deposited on the support can vary within wide limits, which depend essentially on the apparatus used for the casting. By using supports of suitable shapes, it is possible to produce membranes of a variety of different shapes, particularly flat and tubular membranes.

The proportion of the most volatile solvent which is removed in the following stage of the process affects the thickness of the active layer. Thus, depending on the thickness desired for this layer, all or only a part of the most volatile solvent is removed. In general terms, the quantity of solvent removed represents 15 to 100% of the weight of the most volatile solvent. During this operation for the removal of the volatile solvent, it is desirable that the temperature should not exceed the boiling point of the said solvent.

The purpose of the treatment with the non-solvent liquid (step (c)) is to set (or gel) the polymer solution, or, when the evaporation of the volatile solvent has already caused the formation of the gel to begin, to complete the latter. This treatment should be continued until the solvents have been extracted to the maximum extent from the coagulated film. It can be carried out at any temperature whatsoever between the freezing point and the boiling point of the non-solvent chosen. The process is generally carried out at ambient temperature (approximately 23° C). The non-solvent used in this step can be the same as that which was used for the preparation of the casting solution. It is, however, also possible to use a different non-solvent.

As a general rule, the membranes according to the invention are best stored in the moist state.

It is to be understood that the preparation of the membranes of the invention can be carried out continuously or discontinuously.

The membranes of this invention can also be reinforced with a screen such as a woven fabric, for example a woven fabric made from polyamide or polyester, or a non-woven fabric made from natural or synthetic fibres. Such membranes can be prepared in accordance with the technique described above for the non-screen-reinforced membranes, except that the casting step is carried out, not directly on the support, but on the screen, the latter being placed on a support.

The membranes according to the invention combine excellent mechanical properties with properties which are particularly advantageous in the field of reverse osmosis (because of their excellent degree of rejection of salt and flow rate). Because of their relatively large overall thickness, these membranes can be handled easily and possess good flexibility which enables them to withstand, without being damaged, the foldings and mechanical stresses to which they can be subjected during their use in reverse osmosis cells. The extremely low thickness of their active layers gives them a very high permeability (flow rate of water), which could previously only be achieved with membranes of sulphonated phenolic polyethers in the form of extremely thin films.

Because of their properties, the membranes according to the invention can be used advantageously in a variety of applications for membranes which are selective with respect to solutes such as in the desalination of sea water and brackish water, demineralization of underground water and treatment of industrial effluents.

The following Examples further illustrate the present invention.

EXAMPLE 1

(a) Preparation of the sulphonated aromatic polyether 100 g of a polymer consisting essentially of recurring units of the formula

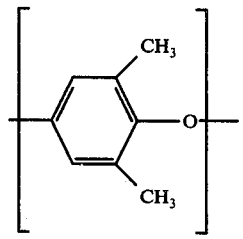

the molecular weight of which is approximately 70,000, and 1,480 cm³ of carefully purified chloroform are introduced, at ambient temperature, into a 2 l three-necked flask equipped with a mechanical stirrer, a reflux condenser, a dropping funnel and a thermometer. After dissolution, the temperature is lowered to 0° C and a mixture of 32.7 g of chlorosulphonic acid and 130 cm³ of chloroform is run in over the course of 1 hour.

At the end of the running in process, the presence of two phases is observed. The mixture is kept at 0° C for a further 2 hours. 250 cm³ of ethanol are then added, and this enables a homogeneous solution to be obtained.

The mass is then cast on plates and evaporated at 40° C in vacuo (200 mm Hg. pressure). Once the solvents have been removed, the polymer is finely ground after immersion in liquid air and is washed with water until the pH is 7.

120 g of polymer are obtained, the specific viscosity (measured at 25° C on a 5 g/l solution of a mixture of equal parts of chloroform and methanol) of which is 0.82.

The ionic capacity of this polymer is 1.84 meg/g, determined as follows:
- a 10% solution of the polymer in a mixture of methanol and chloroform (50/50 by weight) is prepared;
- a 100 μ film is cast from this solution, which detaches easily from the glass;
- a 0.138 g sample of this film is taken and is immersed for 24 hours in 20 cm³ of 0.0988 N sodium hydroxide solution. The film is then rinsed carefully with deionised water, while recovering the wash waters which are combined with the remainder of the sodium hydroxide solution.

The measurement of the quantity of sodium hydroxide remaining makes it possible, by difference, to determine exactly the capacity of the polymer.

(b) Preparation of an asymmetric membrane

A solution is prepared from:
25 g of the abovementioned sulphonated polymer,
35.5 g of methanol,
35.5 g of chloroform and
4 g of glycerine.

To prepare this solution, the polymer is dissolved in the methanol/chloroform mixture and then the glycerine is added, these various operations being carried out at 25° C.

This solution is then cast on a glass plate (thickness of the layer: approximately 200 μ — temperature 25° C). The film is left in the atmosphere for 10 seconds (amount of chloroform evaporated: approximately 20%), and is then immersed in an aqueous solution of NaCl (concentration 10% by weight — temperature 25° C).

After 30 minutes, a membrane is obtained. This membrane is 250 μ thick and has a shiny face free from pores (invisible at a magnification of 20,000), and a matt face showing numerous pores, the diameter of which is as much as 5 μ.

The volume of the pores is approximately 80% of the total volume of the membrane.

This membrane is used in an operation for the desalination of water by reverse osmosis. The brine contains NaCl at a concentration of 5 g/l. The operation is carried out at 20° C under a pressure of 30 bars.

The following results are obtained:
degree of rejection of the salt: 74.2% and
flow rate of water: 26 l/day.m².

Since the flow rate of a membrane of thickness 1 μ, prepared from the same polymer in accordance with the conventional technique, is, under identical conditions, 2.8 l/day.m² (for a pressure of 1 bar), it can be deduced therefrom that the thickness of the active layer in the membrane according to the invention is 0.6 to 0.7 μ.

EXAMPLE 2

The experiment of Example 1 is repeated, replacing the methanol in the casting solution by the same amount of isopropanol.

Following the same procedure as above, a membrane is obtained, the thickness of which is 150 μ and the volume of the pores of which is approximately 63%. This membrane also has a matt face and a shiny face.

When used under the reverse osmosis conditions of Example 1, this membrane gives the following performance:
flow rate: 353 l/day.m² and
degree of rejection: 72.9%.

The equivalent thickness of the active layer of this membrane (determined using the same comparison element as in Example 1) is 0.24 μ.

I claim:

1. A reverse osmosis membrane which consists essentially of a polymer comprising a plurality of units of the formula:

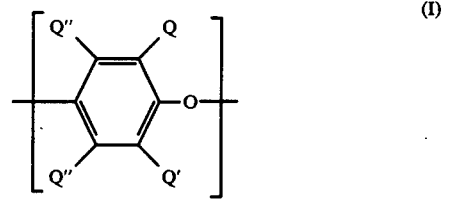

(I)

in which each of the symbols Q, Q' and Q", which can be identical or different, represents a hydrogen atom, an alkyl radical with 1 to 4 carbon atoms or a —SO₃H radical, the number of —SO₃H radicals in the polymer being such that the ionic capacity of the polymer is from about 0.5 to about 5 meq/g, in the form of a layer which exhibits a degree of salt rejection, said layer having an equivalent thickness of from about 0.01 to about 5 μ, and a highly porous support layer, of thickness up to about 1 mm.

2. A membrane according to claim 1, in which the polymer is a sulphonated poly(2,6-dimethyl-1,4-phenylene ether), having an ionic capacity of from about 0.8 to about 3 meq/g.

3. A membrane according to claim 1, in which the polymer has a specific viscosity of from about 0.3 to about 1.5 (measured at 25° C as a 5g/litre solution of a mixture of equal parts by weight of chloroform and methanol).

4. A membrane according to claim 1, in which the pores represent 50 to 90% of the total volume of the membrane.

5. Process for the preparation of a membrane as defined in claim 1 which comprises the following steps, in sequence:
(a) casting, on a support, a solution comprising:
    the said polymer,
    two solvents for the polymer, with substantially different boiling points, and
    a non-solvent for the polymer with a boiling point substantially higher than that of the most volatile solvent,
(b) removing at least a part of the most volatile solvent, and (c) treating the film thus produced with a non-solvent for the polymer.

6. Process according to claim 5, in which the least volatile solvent and the non-solvent both have a boiling point which is at least 30° C higher than that of the most volatile solvent.

7. Process according to claim 5, in which 15 to 100% by weight of the most volatile solvent is removed in step (b).

8. Process according to claim 5 in which the non-solvent in the casting solution used in step (a) represents 2 to 15% by weight based on the weight of the mixture of solvents and non-solvent.

9. Process according to claim 8, in which the most volatile solvent in the casting solution used in step (a) represents 10 to 70% by weight based on the weight of the mixture of solvents and non-solvent.

10. In a process for the desalination of salt water by reverse osmosis the improvement wherein the reverse osmosis membrane is one as defined in claim 1.

* * * * *